United States Patent
Nakamura et al.

(10) Patent No.: US 6,211,260 B1
(45) Date of Patent: Apr. 3, 2001

(54) PHOTOCURABLE PAINT COMPOSITION FOR ROAD MARKINGS

(75) Inventors: Kenichi Nakamura, Ohmiya; Hirotoshi Kamata; Toshio Koshikawa, both of Chiba; Shuichi Sugita, Tokyo, all of (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/185,583

(22) Filed: Nov. 4, 1998

Related U.S. Application Data

(60) Provisional application No. 60/086,141, filed on May 20, 1998.

(30) Foreign Application Priority Data

Nov. 5, 1997 (JP) ................................... 9-303081

(51) Int. Cl.$^7$ ............... C08F 2/48; C08F 2/50; F21V 7/22; C09D 5/00; C08K 3/40
(52) U.S. Cl. ............... 522/14; 522/15; 522/16; 522/18; 522/25; 522/26; 522/28; 522/75; 522/81; 522/83; 522/90; 522/92; 522/96; 522/100; 522/103; 523/172
(58) Field of Search ............... 523/172; 522/14, 522/15, 16, 18, 25, 26, 28, 75, 81, 83, 90, 92, 96, 100, 103

(56) References Cited

U.S. PATENT DOCUMENTS

| | | | |
|---|---|---|---|
| 4,415,603 | * | 11/1983 | Valiot et al. . |
| 5,013,768 | * | 5/1991 | Kiriyama et al. . |
| 5,200,292 | | 4/1993 | Shinozaki et al. . |
| 5,952,152 | * | 9/1999 | Cunningham et al. ............ 430/281.1 |

FOREIGN PATENT DOCUMENTS

| | | |
|---|---|---|
| 197 30 498 A1 | 1/1998 | (DE) . |
| 0 047 200 A2 | 3/1982 | (EP) . |
| 0 389 067 A2 | 9/1990 | (EP) . |
| 6-75374 | 3/1994 | (JP) . |
| 8-209058 | 8/1996 | (JP) . |
| 10-183020 | 7/1998 | (JP) . |
| WO 96/33241 | 10/1996 | (WO) . |

* cited by examiner

*Primary Examiner*—Susan W. Berman
(74) *Attorney, Agent, or Firm*—Sughrue, Mion, Zinn, Macpeak & Seas, PLLC

(57) ABSTRACT

A photocurable paint composition for road markings is disclosed, comprising (A) a compound having an ethylenically unsaturated group, (B) a filler, (C) a cationic dye represented by formula (1):

$$D^+ \bullet A_1^- \qquad (1)$$

(wherein $D^+$ represents a cation having an absorption maximum wavelength in the wavelength region of from 400 to 1,200 nm, and $A_1^-$ represents an optional anion), (D) a quaternary organic borate-type sensitizer represented by formula (2):

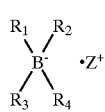

(2)

(wherein $R_1$, $R_2$, $R_3$ and $R_4$ each independently represents an alkyl group, an aryl group, an aralkyl group, an alkenyl group, an alkynyl group, a silyl group, a heterocyclic group or a halogen atom, and $Z^+$ represents an optional cation) and (E) an ultraviolet radical polymerization initiator capable of generating a radical upon absorption of light at a wavelength of 400 nm or less, or additionally comprising (F) glass beads.

7 Claims, No Drawings

PHOTOCURABLE PAINT COMPOSITION FOR ROAD MARKINGS

This application is an application filed under 35 U.S.C. § 111(a) claiming benefit pursuant to 35 U.S.C. § 119(e)(1) of the filing date of the Provisional application Ser. No. 60/086,141, filed May 20, 1998, pursuant to 35 U.S.C. § 111(b).

FIELD OF THE INVENTION

The present invention relates to a coating material for road markings using a composition capable of forming a coated material having a large film thickness by the light energy, which can be photocured within a short time and has excellent abrasion resistance.

BACKGROUND OF THE INVENTION

Conventional coating materials for road markings are classified into JIS K5665 Class 1 (ordinary temperature), Class 2 (heating) and Class 3 (melting). The coating material for road markings is used for marking boundary lines or road signs (hereinafter simply referred to as "road markings") and mainly required to have good drying property, adhesive strength to the road surface, abrasion resistance, staining resistance and the like.

The coating materials of Class 1 and Class 2 are predominantly used for marking outer lines and lane boundaries. These coating materials use a ketone-type, ester-type, aliphatic or aromatic solvent having a high evaporation rate and since the coated film is formed by volatilizing the solvent, there are serious problems in view of safety and air pollution. In order to solve these problems, coating materials for road markings using an aqueous coating material have been proposed (see, JP-A-61-243866 (the term "JP-A" as used herein means an "unexamined published Japanese patent application"), JP-A-3-157463 and JP-A-6-271789), however, water used as a solvent in these coating materials is low in the drying rate and accordingly, these coating materials for road markings are difficult to have quick drying property required.

The coating material of Class 3 is predominantly used for marking zebra zones and center lines. This is a melting-type coating material which is used after melting at from 180 to 220° C., and therefore, this coating material has super-quick drying property and is free of the problem of air pollution. However, in the case of the melting-type coating material, a petroleum resin is generally used as a binder component and since the petroleum resin itself is poor in the abrasion resistance, this coating material is disadvantageously high in the rate of abrasion due to abrading by tires of running cars. In order to maintain the function as a road marking for a necessary time period, the coated film must be formed to have a fairly large thickness of 1 mm or more. For forming a film to have a large thickness, a huge amount of coating material is consumed, the transportation cost of the coating material increases, and the coating work and the like require great labors. Furthermore, a heat source for heat-melting the coating material must be carried into the field and working in a high-temperature environment is unavoidable. Thus, improvements have been demanded from the standpoint of safety and health of workers.

In recent years, photoradical polymerization and photocationic polymerization are drawing attention in view of the quick drying property, ordinary temperature curability, availability of a solvent-free system and energy savings, and these are practically used in various fields such as printed board fabrication, resist or photomask, wood painting, optical fiber coating, hard coating on plastics and can coating. However, since in almost all cases, the light used for the curing has a wavelength in an ultraviolet region of 400 nm or less, the material poorly transmits the light and as in the case of a coating material for road markings, when a film is formed to have a large thickness using a coating material containing a pigment having high covering power, such as titanium oxide, the film is very difficult to cure. To solve this problem, JP-A-8-209058 has attempted to use an acylphosphine oxide-type photopolymerization initiator which is sensitized by a visible ray at from 400 to 450 nm having a relatively high permeability through a material and generates a radical. However, since JP-A-8-209058 uses a low boiling point monomer such as methyl methacrylate, malodors and air pollution are very likely caused. Moreover, the methyl methacrylate is very low in the photocuring rate and the coating material for road markings formed is difficult to photocure in seconds.

The present inventors have previously proposed a photopolymerizable initiator capable of curing a material containing a pigment and having a large thickness (see, JP-A-6-75374 and JP-A-10-81838). According to these techniques, a radical polymerization initiator comprising a cationic dye having an absorption in the visible ray or near infrared ray region and a quaternary organic borate-type sensitizer is added to an ultraviolet ray radical polymerization initiator and thereby high curability can be achieved not only on the surface of the coated film but also in the inside of the photocurable material containing a pigment. However, it is not known to add a specific filler and use the initiator in a paint composition for road markings.

SUMMARY OF THE INVENTION

The object of the present invention is to provide a paint composition for road markings, capable of being photocured within a short time by using a photoradical polymerization initiator which exhibits excellent curability for the thick paint film having high covering power.

The composition of the present invention is free of solvent and uses no low boiling point monomer, accordingly, when the composition is used, the load of air pollution can be remarkably reduced. Furthermore, unlike a melting-type paint, the paint composition of the present invention is not necessary to be melted at a high temperature in the field and thereby working in the safe and comfortable environment is ensured. Moreover, the paint composition of the present invention is advantageous in that due to its abrasion resistance superior to that of melting-type paints, the film thickness can be greatly reduced.

The gist of the present invention resides in:

1) a photocurable paint composition for road markings, comprising (A) a compound having an ethylenically unsaturated group, (B) a filler, (C) a cationic dye represented by formula (1):

(wherein $D^+$ represents a cation having an absorption maximum wavelength in the wavelength region of from 400 to 1,200 nm, and $A_1^-$ represents an optional anion), (D) a quaternary organic borate-type sensitizer represented by formula (2):

(2)

(wherein $R_1$, $R_2$, $R_3$ and $R_4$ each independently represents an alkyl group, an aryl group, an aralkyl group, an alkenyl group, an alkynyl group, a silyl group, a heterocyclic group or a halogen atom, and $Z^+$ represents an optional cation) and (E) an ultraviolet radical polymerization initiator capable of generating a radical upon absorption of light at a wavelength of 400 nm or less;

2) a photocurable paint composition for road markings, comprising (A) a compound having an ethylenically unsaturated group, (B) a filler, (C) a cationic dye represented by formula (1), (D) a quaternary organic borate-type sensitizer represented by formula (2), (E) an ultraviolet radical polymerization initiator capable of generating a radical upon absorption of light at a wavelength of 400 nm or less, and (F) glass beads;

3) the photocurable paint composition for road markings as described in item 1) or 2) above, which further contains one or more compounds selected from a diaryl-iodonium salt, a triarylsulfonium salt, an N-alkoxy-pyridinium salt, a triazine compound having a trihalomethyl group, and a halogenated sulfone compound, as a polymerization accelerator;

4) the photocurable paint composition for road markings as described in items 1) to 3) above, wherein $D^+$ of the cationic dye represented by formula (1) is one or more compounds selected from polymethine, triarylmethane, diarylmethane, xanthene, acridine, azine, oxazine and thiazine-type compounds;

5) the photocurable paint composition for road markings as described in items 1) to 4) above, wherein the ultraviolet radical polymerization initiator is one or more compounds selected from the compounds represented by formula (3) and/or formula (4):

(3)

(wherein Ar represents an aryl group, X represents an alkyl group, an alicyclic group, a benzyl group, an alkoxycarbonyl group, a benzoyl group, an aryl group or a phosphinoyl group having a substituent);

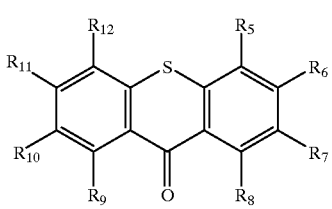

(4)

(wherein $R_5$, $R_6$, $R_7$, $R_8$, $R_9$, $R_{10}$, $R_{11}$ and $R_{12}$ each independently represents a hydrogen atom, an alkyl group, an alkoxy group or a halogen atom);

6) the photocurable paint composition for road markings as described in items 1) to 5) above, wherein the compound having an ethylenically unsaturated group is an epoxy (meth)acrylate resin and/or a urethane (meth)acrylate resin; and 7) the photocurable paint composition for road markings as described in items 1) to 6) above, wherein the compound having an ethylenically unsaturated group is a monofunctional monomer having an alkyl group having from 4 to 18 carbon atoms and/or a monofunctional monomer having an alicyclic group.

DETAILED DESCRIPTION OF THE INVENTION

The compound having an ethylenically unsaturated group for use in the present invention is a compound capable of three-dimensional cross-linking upon radical polymerization and generally classified into an oligomer and a monomer. The monomer is further classified into a monofunctional monomer having one unsaturated group and a polyfunctional monomer having two or more unsaturated groups within the molecule.

The oligomer is a compound having two or more ethylenically unsaturated groups within one molecule and governing various properties of the cured film obtained by the radical polymerization, such as abrasion resistance, durability, weatherability and elongation. The monofunctional monomer is blended for the purpose of reducing the viscosity of the composition of the present invention and thereby improving coatability and workability, and at the same time for increasing adhesion to the road surface. The monofunctional monomer used in the present invention is preferably a compound having a boiling point of 150° C. or more, so that air pollution and malodors can be prevented. The polyfunctional monomer is blended for the purpose of reducing the viscosity of the composition, thereby improving coatability and workability, and for increasing the curability.

Specific examples of the oligomer having an ethylenically unsaturated group for use in the present invention include an epoxy (meth)acrylate resin, a urethane (meth)acrylate resin, a polyester (meth)acrylate resin, a polybutadiene (meth)acrylate resin, a silicone (meth)acrylate resin and an unsaturated polyester resin. Of these, an epoxy (meth)acrylate resin and a urethane (meth)acrylate resin are suitable as a component of the composition of the present invention because these compounds have a high photocuring rate and excellent properties with respect to the abrasion resistance and durability required for the paint composition for road markings.

Incidentally, the term "(meth)acryl" as used in the present invention includes both "methacryl" and "acryl".

The epoxy (meth)acrylate resin is an oligomer generally obtained by reacting a carboxylic acid having a (meth)acryloyl group with an epoxy resin. Specific examples thereof include those described in Nippon Secchaku Gakkai-Shi (Journal of Japan Adhesion Society), Vol. 31, pp. 334–342 (1995), and Kiyoshi Kato, Shigai-Sen Koka System (Ultraviolet Curing System), pp. 180–185, Gakkai Shuppan Center (1989). In particular, an epoxy acrylate resin having a bisphenol structure of exhibiting excellent performance in the abrasion resistance and durability, and having an acryloyl group of ensuring a very high curing rate is preferred for the composition of the present invention which is required to have durability, abrasion resistance and short-time curability.

The urethane (meth)acrylate resin is a generic term of oligomers having a urethane bond and a (meth)acryloyl group within one molecule and generally obtained from polyisocyanate and a hydroxyl group-containing (meth) acrylate or from polyisocyanate, diol and a hydroxyl group-containing (meth)acrylate. Examples of the polyisocyanate, hydroxyl group-containing (meth)acrylate and diol as starting materials of the urethane (meth)acrylate resin include those described in UV●EB Koka Zairyo (UV●EB Curing Materials), pp. 70–74, CMC (1992). Examples of the urethane (meth)acrylate resin include those described in Kiyoshi Kato, Shigai-Sen Koka System (Ultraviolet Curing System), pp. 185–192, Gakkai Shuppan Center (1989).

Specific examples of the monofunctional monomer for use in the present invention include diethylene glycol monoethyl ether (meth)acrylate, triethylene glycol monomethyl ether (meth) acrylate, dipropylene glycol monomethyl ether (meth)acrylate, phenoxyethyl (meth)acrylate, 2-hydroxy-3-phenoxypropyl (meth)acrylate, diethylene glycol monophenyl ether (meth)acrylate, N-vinylpyrrolidone, N-vinylcaprolactam, N-acryloylmorpholine, tetrahydrofurfuryl (meth)acrylate, hydroxy group-containing monomers such as 2-hydroxyethyl (meth)acrylate and 2-hydroxypropyl (meth)acrylate, amino group-containing monomers such as N,N-dimethylaminoethyl (meth)acrylate and N,N-dimethylaminopropyl(meth)acrylamide, acidic group-containing monomers such as (meth)acrylic acid, 2-(meth) acryloyloxyethylsuccinic acid, 2-(meth) acryloyloxyethylphthalic acid and 2-acryloyloxyethyl acid phosphate, and hydrolyzable silyl group-containing monomers such as γ-methacryloxypropyltrimethoxysilane and vinyltriethoxysilane. Of these, monofunctional monomers containing an alkyl group having from 4 to 18 carbon atoms and monofunctional monomers having an alicyclic group are preferred for the composition of the present invention because these have high affinity for asphalt as the base material and the adhesion is greatly improved.

Examples of the monofunctional monomer containing an alkyl group having from 4 to 18 carbon atoms include n-hexyl (meth)acrylate, 2-ethylhexyl (meth)acrylate, decyl (meth)acrylate, isodecyl (meth)acrylate, lauryl (meth) acrylate, stearyl (meth)acrylate, butoxyethyl (meth)acrylate, nonylphenoxy tetraethylene glycol (meth)acrylate and aliphatic monoepoxy acrylate (e.g., EB111 and EB112 produced by Dicel UCB KK). Examples of the monofunctional monomer having an alicyclic group include cyclohexyl (meth)acrylate, 4-tert-butylcyclohexyl (meth)acrylate, dicyclopentanyl (meth)acrylate, dicyclopentenyl (meth)acrylate, dicyclopentanyloxyethyl (meth)acrylate, dicyclopentenyloxyethyl (meth)acrylate and isobornyl (meth)acrylate.

Specific examples of the polyfunctional monomer include diethylene glycol di(meth)acrylate, triethylene glycol di(meth)acrylate, tripropylene glycol di(meth)acrylate, polyethylene glycol di(meth)acrylate, 1,3-butanediol di(meth)acrylate, 1,4-butanediol di(meth)acrylate, neopentyl glycol di(meth)acrylate, 1,6-hexanediol di(meth) acrylate, 1,9-nonanediol di(meth)acrylate, trimethylolpropane tri(meth)acrylate, pentaerythritol tri(meth)acrylate and pentaerythritol tetra(meth)acrylate. More specific examples thereof include those described in UV●EB Koka Gijutsu no O'yo to Shijo (Application and Market of UV●EB Curing Technology), pp. 12–14 and pp. 20–31, CMC (1989).

The photocurable paint composition for road markings of the present invention contains the epoxy (meth)acrylate resin or urethane (meth)acrylate resin in an amount of from 10 to 90 wt % based on the compound having an ethylenically unsaturated group, so that the composition of the present invention can have the required curing rate, abrasion resistance and durability. If the amount added is less than 10 wt %, the abrasion resistance, durability and curing rate are reduced, whereas if it exceeds 90 wt %, the viscosity increases excessively and the coating becomes very difficult. The amount added is preferably from 20 to 80 wt %, more preferably from 40 to 80 wt %.

The monofunctional monomer containing an alkyl group having from 4 to 18 carbon atoms and/or the monofunctional monomer having an alicyclic group is contained in an amount of from 5 to 55 wt % based on the compound having an ethylenically unsaturated group, so that sufficiently high adhesion to the asphalt portion on the road surface can be achieved. If the amount added is less than 5 wt %, the affinity for asphalt decreases to fail in achieving adhesion and at the same time, the viscosity of the composition increases to render the coating difficult, whereas if it exceeds 55 wt %, the curability decreases. The amount added is preferably from 10 to 50 wt %, more preferably from 10 to 40 wt %, most preferably from 10 to 30 wt %.

The polyfunctional monomer is contained in an amount of from 5 to 40 wt % based on the compound having an ethylenically unsaturated bond, so that the composition of the present invention can have the required curing rate. If the amount added is less than 5 wt %, a sufficiently high curing rate cannot be obtained and at the same time, the viscosity of the composition increases to render the coating difficult, whereas if it exceeds 40 wt %, great shrinkage is caused by the curing and the film formed is readily peeled off from the road surface. The amount added is preferably from 10 to 30 wt %.

The filler for use in the present invention is added for the purpose of increasing weatherability, visibility, covering power, abrasion resistance and adhesion, and a filler conventionally used in the coating material for road markings can be used. Specific examples of the filler include inorganic fillers such as calcium carbonate, aluminum hydroxide, calcium sulfate, barium sulfate, talc, alumina, silicon oxide and glass powder, and colored pigment such as titanium oxide and chrome yellow which is blended so as to improve particularly the luminous reflectance and covering power. With respect to the colored pigment, the colored pigments described in Kaitei Shinpan, Ganryo Binran (Revised and New Edition, Pigment Handbook), compiled by Nippon Ganryo Gijutsu Kyokai (1989) may also be used. These fillers may be used in combination of two or more thereof. The filler is blended in an amount of from 10 to 400 parts by weight per 100 parts by weight of the compound having an ethylenically unsaturated group. If the amount blended is less than 10 parts by weight, the visibility, covering power and weatherability are reduced, whereas if it exceeds 400 parts by weight, the viscosity of the coating material excessively increases and the coatability is seriously deteriorated. The amount blended is preferably from 20 to 200 parts by weight.

The glass bead for use in the present invention means a glass bead having a particle size of from 0.01 to 10 mm and is added for the purpose of increasing the light reflectivity of the coated film to thereby increase the visibility at night and at the same time for improving the photocurability inside the film. As the glass bead in the coated film has a smaller particle size, the curability is more improved but the reflective ability is more reduced. On the other hand, as the particle size increases, the glass bead more easily falls off from the coated film. Accordingly, the particle size of the glass bead is preferably from 0.01 to 2.0 mm, most preferably from 0.05 to 10 mm. If the amount of glass beads mixed is small, the reflective ability is deteriorated when the glass beads interspersed are decreased due to abrasion by tires, whereas if it is too large, the film is reduced in the strength. Accordingly, in the case of adding glass beads, the glass beads are suitably added in an amount of from 30 to 400 parts by weight, preferably from 60 to 300 parts by weight, per 100 parts by weight of the compound having an ethylenically unsaturated group.

The cationic dye represented by formula (1) and the quaternary organic borate-type sensitizer represented by formula (2) of the present invention are added for the purpose of increasing the inside curability of the film:

$$D^+ \bullet A_1^- \quad (1)$$

(wherein $D^+$ represents a cation having an absorption maximum wavelength in the wavelength region of from 400 to 1,200 nm, and $A_1^-$ represents an optional anion);

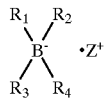
(2)

(wherein $R_1$, $R_2$, $R_3$ and $R_4$ each independently represents an alkyl group, an aryl group, an aralkyl group, an alkenyl group, an alkynyl group, a silyl group, a heterocyclic group or a halogen atom, and $Z^+$ represents an optional cation).

When the cationic dye represented by formula (1) and the quaternary organic borate-type sensitizer represented by formula (2) are used in combination, decomposition takes place by the light at a wavelength of from 400 to 1,200 nm, as a result, the color of the cationic dye disappears and at the same time, radical polymerization is initiated. If the quaternary organic borate-type sensitizer is not present together, the decolorization reaction of the cationic dye may not proceed satisfactorily or the polymerization reaction is difficult to occur. However, when a quaternary organic borate-type sensitizer is rendered to be present together, the decolorization reaction of the cationic dye perfectly proceeds and the polymerization initiating reaction efficiently takes place. Furthermore, when a polymerization accelerator selected from a diaryliodonium salt, a triarylsulfonium salt, an N-alkoxypyridinium salt, a triazine compound having a trihalomethyl group, and a halogenated sulfone compound is added, the polymerization initiating reaction proceeds more efficiently. The polymerization accelerator is a compound which accepts an electron from a dye radical generated upon irradiation of light at a wavelength of from 400 to 1,200 nm and generates a radical, and can remarkably improve the internal curability of the cured product.

$D^+$ in formula (1) for use in the present invention is a compound having an absorption maximum wavelength in the wavelength region of from 400 to 1,200 nm. The absorption maximum wavelength can be determined by dissolving a cationic dye in a general solvent such as water, methanol, ethanol, toluene, xylene, acetone, methyl ethyl ketone, ethyl acetate, n-butyl acetate, N,N-dimethylformamide, N-methyl-2-pyrrolidone, chloroform, methylene chloride, acetonitrile and dimethyl sulfoxide, and measuring the absorption spectrum of the compound in the region of from ultraviolet ray to near infrared ray using a commonly used spectrophotometer having a capability to this effect (for example, Ubest V-570 manufactured by Nippon Bunko KK or UV-3100 manufactured by Shimadzu Seisakusho). The method for determining the absorption maximum wavelength is, however, not limited thereto. $D^+$ is preferably a polymethine-type compound, a xanthene-type compound, a triarylmethane-type compound, a diarylmethane-type compound, an acridine-type compound, an azine-type compound, an oxazine-type compound or a thiazine-type compound. In particular, polymethine-type and triarylmethane-type compounds are superior in the polymerization initiating ability and the decolorizing ability and accordingly, suitably used in the present invention.

Specific examples of $A_1^-$ in formula (1) include halide anions such as $Cl^-$, $Br^-$ and $I^-$, sulfonate anions such as benzenesulfonate anion, p-toluenesulfonate anion, methanesulfonate anion and 1-naphthalenesulfonate anion, borate anions such as tetraphenylborate, tetraanisylborate, n-butyltriphenylborate, tetrabenzylborate and tetrafluoroborate, and various anions such as $ClO_4^-$, $PF_6^-$ and $SbF_6^-$, however, the present invention is by no means limited thereto.

Specific examples of the structure of the cationic dye are shown in Table 1 below, however, the present invention is not limited thereto by any means. These cationic dyes may be used, if desired, in combination of two or more thereof and the mixing ratio may be freely selected.

TABLE 1

Representative Examples of Cationic Dye ($D^+ \bullet A_1^-$)

| No. | $D^+$ | $A_1^-$ | Absorption Maximum Wavelength (Kind of Solvent Measured) |
|---|---|---|---|
| 1 |  | perchlorate anion | 522 nm (acetonitrile) |

TABLE 1-continued

Representative Examples of Cationic Dye (D$^+$·A$_1^-$)

| No. | D$^+$ | A$_1^-$ | Absorption Maximum Wavelength (Kind of Solvent Measured) |
|---|---|---|---|
| 2 | (structure) | iodide anion | 528 nm (ethanol) |
| 3 | (structure) | chloride anion | 527 nm (acetonitrile) |
| 4 | (structure) | chloride anion | 534 nm (acetonitrile) |
| 5 | (structure) | 1-naphthalene-sulfonate anion | 543 nm (acetonitrile) |
| 6 | (structure) | chloride anion | 544 nm (acetonitrile) |
| 7 | (structure) | tetraphenyl borate | 549 nm (acetonitrile) |
| 8 | (structure) | chloride anion | 559 nm (acetonitrile) |

TABLE 1-continued

Representative Examples of Cationic Dye (D$^+$·A$_1^-$)

| No. | D$^+$ | A$_1^-$ | Absorption Maximum Wavelength (Kind of Solvent Measured) |
|---|---|---|---|
| 9 | (structure) | chloride anion | 560 nm (acetonitrile) |
| 10 | (structure) | n-butyl triphenyl borate | 822 nm (acetonitrile) |
| 11 | (structure) | p-toluene sulfonate anion | 820 nm (acetonitrile) |
| 12 | (structure) | p-toluene sulfonate anion | 830 nm (acetonitrile) |
| 13 | (structure) | chloride anion | 552 nm (ethanol) |

TABLE 1-continued
Representative Examples of Cationic Dye (D⁺·A₁⁻)
| No. | D⁺ | A₁⁻ | Absorption Maximum Wavelength (Kind of Solvent Measured) |
|---|---|---|---|
| 14 | 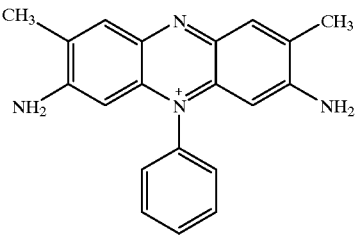 | chloride anion | 528 nm (chloroform) |
| 15 | 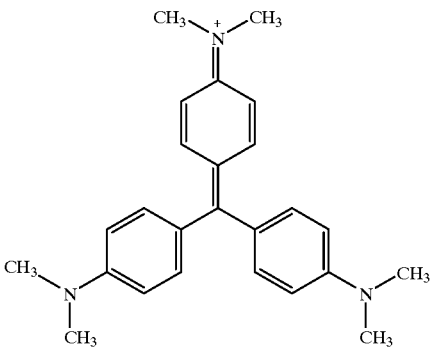 | tetraphenyl borate | 589 nm (acetonitrile) |
| 16 | 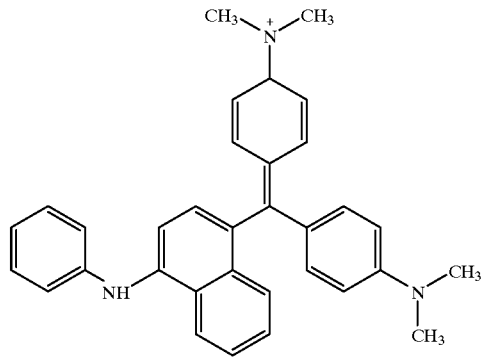 | chloride anion | 613 nm (acetonitrile) |
| 17 | 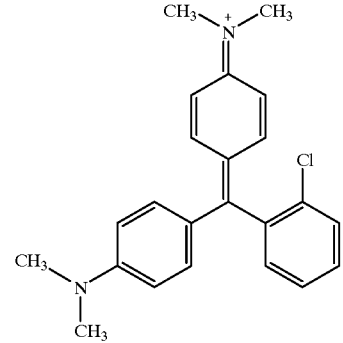 | chloride anion | 632 nm (acetonitrile) |

The absorption maximum wavelengths shown in Table 1 were determined using an ultraviolet-visible-near infrared spectrophotometer, Ubest V-570, manufactured by Nippon Bunko KK.

The quaternary organic borate-type sensitizer for use in the present invention consists of a quaternary organic boron compound and $Z^+$ as shown in formula (2):

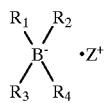

(2)

(wherein $R_1$, $R_2$, $R_3$ and $R_4$ each independently represents an alkyl group, an aryl group, an aralkyl group, an alkenyl group, an alkynyl group, a silyl group, a heterocyclic group or a halogen atom, and $Z^+$ represents an optional cation)

In formula (2), the alkyl group, the aryl group, the aralkyl group, the alkenyl group, the alkynyl group, the silyl group and the heterocyclic group represented by $R_1$, $R_2$, $R_3$ or $R_4$ each may have any substituent. Specific examples of the substituent include a methyl group, an ethyl group, a n-propyl group, an isopropyl group, a n-butyl group, a sec-butyl group, an isobutyl group, a tert-butyl group, a n-octyl group, a n-dodecyl group, a cyclopentyl group, a cyclohexyl group, a phenyl group, a tolyl group, a xylyl group, an anisyl group, a biphenyl group, a naphthyl group, a benzyl group, a phenethyl group, a diphenylmethyl group, a methoxy group, an ethoxy group, a n-propoxy group, an isopropoxy group, a n-butoxy group, a sec-butoxy group, a tert-butoxy group, a methylenedioxy group, an ethylenedioxy group, a phenoxy group, a naphthoxy group, a benzyloxy group, a methylthio group, a phenylthio group, a 2-furyl group, a 2-thienyl group, a 2-pyridyl group and a fluoro group, however, the present invention is by no means limited these examples.

Specific examples of the quaternary boron compound represented by formula (2) include n-butyltriphenylborate, n-octyltriphenylborate, n-dodecyltriphenylborate, sec-butyltriphenylborate, tert-butyltriphenylborate, benzyltriphenylborate, n-butyltri(p-anisyl)borate, n-octyltri(p-anisyl)borate, n-dodecyltri(p-anisyl)borate, n-butyltri(p-tolyl)borate, n-butyltri(o-tolyl)borate, n-butyltri(4-tert-butylphenyl)borate, n-butyltri(4-fluoro-2-methylphenyl)borate, n-butyltri(4-fluorophenyl)borate, n-butyl-trinaphthylborate, triphenylsilyltriphenylborate, trimethylsilyltriphenylborate, tetra-n-butylborate, di-n-butyldiphenylborate and tetrabenzylborate. Of these, compounds having a structure such that $R_1$ is an alkyl group and $R_2$, $R_3$ and $R_4$ each is an aryl group are well balanced between the stability and the curability and suitable for the photocurable paint composition for road markings of the present invention.

Specific examples of $Z^+$ in formula (2) include tetramethylammonium, tetraethylammonium, tetra-n-butylammonium, tetraoctylammonium, N-methylquinolinium, N-ethylquinolinium, N-methylpyridinium, N-ethylpyridinium, tetramethylphosphonium, tetra-n-butylphosphonium, trimethylsulfonium, triphenylsulfonium, trimethylsulfoxonium, diphenyliodonium, di(4-tert-butylphenyl)iodonium, lithium cation and sodium cation. Any combination of the quaternary organic boron compound and $Z^+$ may be used in the present invention. The present invention is, however, not limited to those examples by any means. The quaternary organic borate-type sensitizers may be used in combination of two or more thereof.

The ultraviolet radial polymerization initiator for use in the present invention is used for the purpose of curing the surface layer of the coated film. The ultraviolet radical polymerization initiator used is a normal photopolymerization initiator which is excited by the irradiation of ultraviolet ray at 400 nm or less and generates a radical. The ultraviolet radical polymerization initiator includes the compounds represented by formula (3) and/or formula (4):

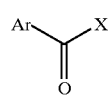

(3)

(wherein Ar represents an aryl group, X represents an alkyl group, an alicyclic group, a benzyl group, an alkoxycarbonyl group, a benzoyl group, an aryl group or a phosphinoyl group having a substituent);

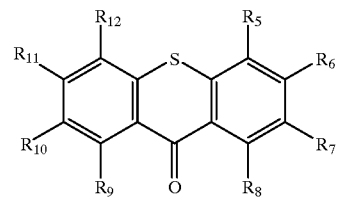

(4)

(wherein $R_5$, $R_6$, $R_7$, $R_8$, $R_9$, $R_{10}$, $R_{11}$ and $R_{12}$ each independently represents a hydrogen atom, an alkyl group, an alkoxy group or a halogen atom).

In formula (3), the aryl group represented by Ar may have any substituent. Specific examples of the substituent include a methyl group, an ethyl group, a n-propyl group, an isopropyl group, a n-butyl group, a sec-butyl group, an isobutyl group, a tert-butyl group, a n-octyl group, a n-dodecyl group, a cyclohexyl group, a phenyl group, a tolyl group, an anisyl group, a naphthyl group, a benzyl group, a phenethyl group, a methoxy group, an ethoxy group, a n-propoxy group, an isopropoxy group, a n-butoxy group, a sec-butoxy group, a tert-butoxy group, a 2-hydroxyethoxy group, a phenoxy group, a naphthoxy group, a benzyloxy group, a hydroxy group, an acetoxy group, a benzoyloxy group, an acryloyloxy group, a methacryloyloxy group, a carboxyl group, a methoxycarbonyl group, an ethoxycarbonyl group, a benzoyl group, a naphthoyl group, an acetyl group, a propionyl group, a dimethylamino group, a diethylamino group, a morpholino group, a methylthio group, a phenylthio group, a 2-furyl group, a 2-furfuryl group, a 2-thienyl group, a 2-pyridyl group, a 2-quinolinyl group, a fluoro group, a chloro group and a bromo group, however, the present invention is by no means limited to these examples.

In formula (3), the alkyl group, the alicyclic group, the benzyl group, the alkoxycarbonyl group, the benzoyl group and the aryl group represented by X each may have a substituent. Specific examples of the substituent include a methyl group, an ethyl group, a n-propyl group, an isopropyl group, a n-butyl group, a sec-butyl group, an isobutyl group, a tert-butyl group, a n-octyl group, a n-dodecyl group, a cyclohexyl group, a phenyl group, a tolyl group, an anisyl group, a naphthyl group, a benzyl group, a phenethyl group, a methoxy group, an ethoxy group, a n-propoxy group, an isopropoxy group, a n-butoxy group, a sec-butoxy group, a tert-butoxy group, a phenoxy group, a naphthoxy group, a benzyloxy group, a hydroxy group, an acetoxy group, a benzoyloxy group, a carboxyl group, a methoxycarbonyl group, an ethoxycarbonyl group, a benzoyl group, a naphthoyl group, an acetyl group, a propionyl group, a dimethylamino group, a diethylamino group, a morpholino group, a methylthio group, a phenylthio group, a 2-furyl group, a 2-furfuryl group, a 2-thienyl group, a 2-pyridyl group, a 2-quinolinyl group, a fluoro group, a chloro group and a bromo group, however, the present invention is by no means limited to these examples.

Specific examples of the substituent of the phosphinoyl group having a substituent represented by X in formula (3) include a methyl group, an ethyl group, a n-propyl group, an isopropyl group, a n-butyl group, a sec-butyl group, an isobutyl group, a tert-butyl group, a 2-ethylhexyl group, a n-octyl group, a 2,4,4-trimethylpentyl group, a cyclohexyl group, a phenyl group, a tolyl group, a 2,5-dimethylphenyl group, a mesityl group, a cumenyl group, a benzyl group, a phenethyl group, a benzoyl group, a 2,6-dichlorobenzoyl group, a 2,4,6-trimethylbenzoyl group, a 2,6-dimethoxybenzoyl group, a 2,6-diethoxybenzoyl group and a naphthoyl group, however, the present invention is not limited to these examples by any means.

Specific examples of the compound represented by formula (3) include benzoin-type compounds such as benzoin isobutyl ether, benzoin isopropyl ether, benzoin ethyl ether and benzyl dimethyl ketal, acetophenone-type compounds such as diethoxyacetophenone, 2-hydroxy-2-methyl-1-phenylpropan-1-one, 1-(4-isopropylphenyl)-2-hydroxy-2-methylpropan-1-one, 1-hydroxycyclohexyl phenyl ketone, 4-tert-butyltrichloroacetophenone, 2-methyl-1-[4-(methylthio)phenyl]-2-morpholinopropanone-1 and 2-benzyl-2-dimethylamino-1-(4-morpholinophenyl)-butanone-1, glyoxy ester-type compounds such as methylphenylglyoxylate, benzophenone-type compounds such as benzophenone, methyl benzoylbenzoate, hydroxybenzophenone, 4-phenylbenzophenone and acrylated benzophenone, and acylphosphine oxide-type compounds such as 2,4,6-trimethylbenzoyldiphenylphosphine oxide, bis(2,6-dimethoxybenzoyl)-2,4,4-trimethylpentyl-phosphine oxide, bis(2,6-dichlorobenzoyl)phenylphosphine oxide, bis(2,6-dichlorobenzoyl)-2,5-dimethylphenylphosphine oxide and bis(2,4,6-trimethylbenzoyl) phenylphosphine oxide.

The alkyl group and the alkoxy group represented by $R_5$, $R_6$, $R_7$, $R_8$, $R_9$, $R_{10}$, $R_{11}$ or $R_{12}$ in the compound represented by formula (4) are an alkyl group having from 1 to 8 carbon atoms and an alkoxy group having from 1 to 8 carbon atoms, respectively. Specific examples of the compound represented by formula (4) include 2,4-diethylthioxanthone, isopropylthioxanthone, 2,4-diisopropylthioxantone and 1-chloro-4-propoxythioxanthone.

In general, the compound called a P1-type photoinitiator, such as a benzoin-type compound, an acetophenone-type compound, a glyoxy ester-type compound and an acylphosphine oxide-type compound, can be used alone by itself but an ultraviolet radial polymerization initiator which is a P2-type photoinitiator, such as a benzophenone-type compound and thioxanthone-type compound, is used in combination with a hydrogen-donating compound. Also in the case of a P1-type photoinitiator, if a hydrogen donator is used in combination, the curability is improved.

The hydrogen-donating compound is a compound capable of donating hydrogen to the initiator excited by light. Examples thereof include aliphatic amines such as triethanolamine and methyldiethanolamine, and aromatic amines such as 2-dimethylaminoethylbenzoic acid, ethyl 4-dimethylaminobenzoate, isobutyl 4-dimethylaminobenzoate and 4,4-dimethylaminobenzophenone. These ultraviolet radical polymerization initiators may be used either individually or in combination of two or more thereof.

The polymerization accelerator for use in the present invention is specifically described below. The diaryliodonium salt comprises a diaryliodonium cation and any anion ($A_2^-$). Specific examples of the diaryliodonium cation include diphenyliodonium, p-anisylphenyliodonium, di(4-tert-butylphenyl)iodonium, di(4-chlorophenyl)iodonium, di(o-tolyl)iodonium and di(3-nitrophenyl)iodonium.

The triarylsulfonium salt comprises a triarylsulfonium cation and any anion ($A_3^-$). Specific examples of the triarylsulfonium cation include triphenylsulfonium, diphenyl(p-anisyl)sulfonium, diphenyl(o-tolyl)sulfonium, diphenyl(4-fluorophenyl)sulfonium, diphenyl[4-(phenylthio)phenyl]-sulfonium and diphenyl[4-(diphenylsulfonium)phenyl] sulfonium.

The N-alkoxypyridinium salt comprises an N-alkoxypyridinium cation and any anion ($A_4^-$). Specific examples of the N-alkoxypyridinium cation include N-ethoxypyridinium, N-ethoxy-2-picolinium, N-ethoxy-3-picolinium, N-ethoxy-4-chloropyridinium, N-ethoxy-3-chloropyridinium, N-ethoxy-2-chloropyridinium, N-ethoxy-4-methoxypyridinium, N-ethoxy-3-methoxypyridinium, N-ethoxy-2-methoxypyrdinium, N-ethoxy-4-phenylpyridinium, N-ethoxy-4-cyanopyridinium, N,N'-diethoxy-4,4'-bipyridinium and N,N'-diethoxy-2,2'-bipyridinium.

Specific examples of $A_2^-$, $A_3^-$ and $A_4^-$ include $BF_4^-$, $PF_6^-$, $AsF_6^-$, $SbF_6^-$, $ClO_4^-$, $Cl^-$, $Br^-$, tetraphenylborate, tetrakis(pentafluorophenyl)borate, benzenesulfonate anion, p-toluenesulfonate anion and trifluoromethanesulfonate anion. The anion and the diaryliodonium, triphenylsulfonium or N-alkoxypyridinium cation may be freely combined and used in the present invention.

Specific examples of the triazine compound having a trichloromethyl group include 2,4,6-tris(trichloromethyl)-s-triazine, 2,4,6-tris(tribromomethyl)-s-triazine, 2,4-bis(dichloromethyl)-6-trichloromethyl-s-triazine, 2-(4-chlorophenyl)-4,6-bis(trichloromethyl)-s-triazine, 2,4-bis(4-methoxyphenyl)-6-trichloromethyl-s-triazine, 2,4-bis(3-chlorophenyl)-6-trichloromethyl-s-triazine, 2-(4-methoxystyryl)-4,6-bis(trichloromethyl)-s-triazine, 2,4-bis(3-chlorophenyl)-6-trichloromethyl-s-triazine and 2-(4-chlorostyryl)-4,6-bis(trichloromethyl)-s-triazine.

Specific examples of the halogenated sulfone compound include trichloromethylphenylsulfone, tribromomethylphenylsulfone, trichloromethyl-4-chlorophenylsulfone, 2,4-dichlorophenyltrichloromethylsulfone, 2-methyl-4-chlorophenyltrichloromethylsulfone and 2,4-dichlorophenyltribromomethylsulfone.

These polymerization accelerators may be used in combination of two or more thereof.

The amount of the photopolymerization initiator added is described below. The cationic dye represented by formula (1) is used in an amount of from 0.001 to 5 parts by weight per 100 parts by weight of the compound having an ethylenically unsaturated group, so that the object of the present invention can be achieved. If the amount added is less than 0.001 part by weight, polymerization does not proceed satisfactorily and incomplete curing may result, whereas if it exceeds 5 parts by weight, the cured product is colored and the object of the present invention cannot be successfully achieved. The amount added is preferably from 0.01 to 2 parts by weight.

The quaternary organic borate-type sensitizer represented by formula (2) is used in an amount of from 0.005 to 10 parts by weight per 100 parts by weight of the compound having an ethylenically unsaturated group, so that the object of the present invention can be achieved. If the amount added is less than 0.005 part by weight, polymerization does not proceed satisfactorily, incomplete curing may result and moreover, the cured product may be colored due to insufficient proceeding of the decolorization reaction of the cationic dye, whereas if it exceeds 10 parts by weight, the cured product is deteriorated in the physical properties. The amount added is preferably from 0.05 to 5 parts by weight.

The polymerization accelerator is used in an amount of from 0.005 to 10 parts by weight per 100 parts by weight of the compound having an ethylenically unsaturated group, so that the object of the present invention can be achieved. If the amount added is less than 0.005 part by weight, the effect of the polymerization accelerator cannot be brought out, whereas if it exceeds 10 parts by weight, the physical properties of the cured product may be deteriorated or the stability of the composition of the present invention may be extremely reduced. The amount added is preferably from 0.01 to 5 parts by weight.

The ultraviolet radical polymerization initiator is used in an amount of from 0.01 to 10 parts by weight per 100 parts by weight of the compound having an ethylenically unsaturated group, so that the object of the present invention can be achieved. If the amount added is less than 0.01 part by weight, curing cannot proceed in air, whereas if it exceeds 10 parts by weight, the physical properties of the cured product may be reduced or the cured product is deteriorated by the residual ultraviolet radical polymerization initiator and disadvantageously colored yellow. The amount added is preferably from 0.1 to 5 parts by weight.

The photocurable paint composition for road markings of the present invention may contain an organic polymer compound for the purpose of imparting appropriate elongation to the cured product and allowing the cured product to follow expansion of the asphalt due to change in the temperature, thereby inhibiting generation of cracks. For imparting appropriate elongation to the photocured product of the composition of the present invention, a known method of, for example, blending a low molecular weight plasticizer such as di-n-butyl phthalate and dioctyl phthalate, or a compound having an ethylenically unsaturated group and capable of forming a homopolymer having a glass transition temperature lower than the temperature on use is also very effective but by blending an organic polymer compound, the cured product can have appropriate elongation and higher abrasion resistance at the same time. The organic polymer compound as used herein is a homopolymer or copolymer of an organic monomer and a compound having a number average molecular weight of 1,000 or more. Examples of the organic polymer compound include polystyrene resin, polyurethane resin, polyvinylacetal resin, polyvinylbutyral resin, saturated polyester resin, chlorinated polyolefin, rubber components such as butadiene rubber, styrene-butadiene rubber, nitrile rubber and acryl rubber, various types of thermoplastic elastomers such as polystyrene type, polyolefin type, polydiolefin type, polyurethane type and polyester type, and homopolymers or copolymers of a (meth)acrylic acid alkyl ester such as polyethyl (meth)acrylate and poly-butyl (meth)acrylate. Of these, in view of compatibility with the compound having an ethylenically unsaturated group, saturated polyester resin and homopolymers or copolymers of a (meth)acrylic acid alkyl ester are preferred in the present invention. The amount of the organic polymer compound blended is from 3 to 30 parts by weight per 100 parts by weight of the compound having an ethylenically unsaturated group, so that the object of the present invention can be achieved. If the amount blended is less than 3 parts by weight, the photocured product has no elongation and cannot follow the extension of asphalt due to change in the temperature, whereas if it exceeds 30 parts by weight, the photocurability is extremely reduced. The amount blended is preferably from 5 to 25 parts by weight.

The photocurable paint composition for road markings of the present invention is in the form of a solvent-free coating material but may also be used by diluting it with a solvent as conventionally employed. In this case, the solvent used may be a solvent commonly used in conventional painting materials and examples thereof include aromatic hydrocarbons such as toluene and xylene, alcohols such as ethanol, 2-propanol and 1-butanol, ketones such as methyl ethyl ketone and methyl isobutyl ketone, ethers such as diethylene glycol dimethyl ether and triethylene glycol dimethyl ether, esters such as ethyl acetate and butyl acetate, and monoethers of ethylene glycol such as methyl cellosolve and ethyl cellosolve. These solvents may be used individually or in combination of two or more thereof. The organic solvent is used so as to reduce the viscosity of the composition and improve the workability, adhesion to asphalt and the like.

The photocurable paint composition for road markings of the present invention may contain a thermal polymerization inhibitor for the purpose of preventing polymerization during the storage. Specific examples of the thermal polymerization inhibitor which can be added to the paint composition of the present invention include p-methoxyphenol, hydroquinone, alkyl-substituted hydroquinone, catechol, tert-butyl catechol and phenothiazine.

The photocurable paint composition for road markings of the present invention may of course contain an organic peroxide as a thermoploymerization initiator for the purpose of accelerating curing. Specific examples of the organic peroxide include benzoyl peroxide, dicumyl peroxide, di-tert-butyl peroxide, tert-butyl peroxybenzoate, tert-butyl peroxy-2-ethylhexanoate, tert-butyl peroxylaurate, tert-butyl hydroperoxide, dicumyl hydroperoxide, 3,3,5-trimethylhexanoyl peroxide, diisopropyl peroxydicarbonate. For more accelerating the curing, a cobalt salt such as cobalt naphthenate and cobalt octylate, or an amine compound such as dimethylaniline, may be used in combination with the above-described organic peroxide.

The photocurable paint composition for road markings of the present invention may further contain general additives for coating materials so as to improve workability, physical properties of the coating material or physical properties of the coated film. Examples of the additive for coating materials include a dispersant, a precipitation inhibitor, a defoaming agent, a leveling agent, a running inhibitor and a wax.

Furthermore, the photocurable paint composition for road markings of the present invention may contain an antioxidant, a photostabilizer or an ultraviolet absorbent for the purpose of preventing photodeterioration caused after painting and curing of the composition on the road surface. Examples of the antioxidant include hindered phenol-type antioxidants such as 2,4,6-tri-tert-butylphenol, 2,6-di-tert-butyl-p-cresol, N,N'-hexamethylenebis(3,5-di-tert-butyl-4-hydroxyhydrocinnamide), octadecyl-3-(3,5-di-tert-butyl-4-hydroxyphenyl)propionate, 3,5-di-tert-butyl-4-hydroxybenzylphosphonate-diethyl ester, isooctyl-3-(3,5-di-tert-butyl-4-hydroxyphenyl)propionate and tris(3,5-di-tert-butyl-4-hydroxybenzyl)isocyanurate, phosphite-type antioxidants such as triphenylphosphite, tris(2,4-di-tert-butylphenyl)phosphite, tris(nonylphenyl)phosphite, diphenylisodecylphosphite, phenyldiisodecylphosphite, cyclic neopentanetetraylbis(octadecylphosphite) and 2,2-methylenebis(4,6-di-tert-butylphenyl)octylphosphite, and thioether-type antioxidants such as dilauryl 3,3'-thiodipropionate, dimyristyl 3,3-thiodipropionate and pentaerythrityl tetrakis(3-laurylthiopropionate).

Examples of the photostabilizer include hindered amine-type photostabilizers such as bis(2,2,6,6-tetramethyl-4-piperidyl)sebacate, bis(1,2,2,6,6-pentamethyl-4-piperidyl) sebacate, bis(1,2,2,6,6-pentamethyl-4-piperidyl) 2-(3,5-di-tert-butyl-4-hydroxybenzyl)-2-n-butylmalonate and 4-benzoyloxy-2,2,6,6-tetramethylpiperidine.

Examples of the ultraviolet absorbent include benzotriazole-type compounds such as 2-(3,5-di-tert-butyl-2-hydroxyphenyl)benzotriazole, 2-(3-tert-butyl-5-methyl-2-hydroxyphenyl)benzotriazole and 2-(3,5-di-tert-amyl-2-hydroxyphenyl)benzotriazole, benzoate-type compounds such as 2,4-di-tert-butylphenyl-3,5-di-tert-butyl-4-hydroxybenzoate, salicylate-type compounds such as p-tert-butylphenylsalicylate and p-octylphenylsalicylate, benzophenone-type compounds such as 2-hydroxy-4-octoxybenzophenone and 2-hydroxy-4-dodecyloxy-benzophenone, cyanoacrylate-type compounds such as ethyl-2-cyano-3,3'-diphenyl acrylate and 2-ethylhexyl-2-cyano-3,3'-diphenyl acrylate, and metal complex compounds such as nickel bis(octylphenyl)sulfide and nickel dibutyldithiocarbamate.

The photocurable paint composition for road markings of the present invention can be cured by simultaneously or separately irradiating thereon ultraviolet ray having a wavelength of 400 nm or less and light having a wavelength of from 400 to 1,200 nm. Examples of the light source which emits ultraviolet ray at 400 nm or less include a high-pressure mercury lamp, an extra-high pressure mercury lamp, a metal halide lamp, a short arc metal halide lamp and a xenon lamp. Examples of the light source which emits light at from 400 to 1,200 nm include a high-pressure mercury lamp, an extra-high pressure mercury lamp, a metal halide lamp, a short arc metal halide lamp, a xenon lamp, a sodium lamp, a halogen lamp, an incandescent lamp and sun light. When a light source capable of simultaneously emitting ultraviolet ray at 400 nm or less and light at from 400 to 1,200 nm, such as a high-pressure mercury lamp, an extra-high pressure mercury lamp, a metal halide lamp, a short arc metal halide lamp and a xenon lamp, is used, the composition can be completely cured using one light source.

The present invention is described below by referring to the Examples, however, the present invention should not be construed as being limited to these Examples.

EXAMPLES

Preparation of Various Photopolymerization Initiators

Using a cationic dye, a quaternary organic borate-type sensitizer, a polymerization accelerator, an ultraviolet radical polymerization initiator and N-methyl-2-pyrrolidone, Photopolymerization Initiator Solutions PI-1, PI-2, PI-3, PI-4 and PI-5 were prepared each to have a composition shown in Table 2 and used in the Examples. Separately, Comparative Photopolymerization Initiators CPI-I and CPI-2 were prepared using only an ultraviolet radical polymerization initiator as the polymerization initiator component and used in Comparative Examples 1 and 2.

TABLE 2

Composition of Photopolymerization Initiator Solution

| Kind of photopolymerization Initiator Solution | Cationic Dye ($D^+ \cdot A_1^-$) | Quaternary Organic Borate-Type Sensitizer | Polymerization Accelerator | Ultraviolet Radical Polymerization Initiator | Amount of N-Methyl-2-Pyrrolidone Blended |
|---|---|---|---|---|---|
| PI-1 | Table 1, No. 10 2.0 parts by weight | tetra-n-butylammonium n-butyltriphenylborate 10.0 parts by weight | triphenylsulfonium triflate 8.0 parts by weight | Darocur 1173 *1 30.0 parts by weight | 50.0 parts by weight |
| PI-2 | Table 1, No. 3 0.8 parts by weight | tetra-n-butylammonium n-butyltri(4-tert-butylphenyl)borate 10.0 parts by weight | — | Iragacure 1800 *2 40.0 parts by weight | 49.2 parts by weight |
| PI-3 | Table 1, No. 7 1.5 parts by weight | tetra-n-butylammonium n-butyltrinaphthyl-borate 15.0 parts by weight | diphenyliodonium triflate 5.0 parts by weight | Irgacure 651 *3 30.0 parts by weight | 48.5 parts by weight |
| PI-4 | Table 1, No. 6 0.7 parts by weight | tetra-n-butylammonium n-butyltri(4-tert-butylphenyl)borate 10.0 parts by weight | — | Irgacure 184 *4 30.0 parts by weight Lucirin TPO *5 10.0 parts by weight | 49.3 parts by weight |
| PI-5 | Table 1, No. 9 0.6 parts by weight | tetra-n-butylammonium n-butyltriphenylborate 10.0 parts by weight | triphenylsulfonium triflate 9.0 parts by weight | Darocur 1173 30.0 parts by weight | 50.4 parts by weight |
| CPI-1 | — | — | — | Irgacure 651 30.0 parts by weight | 70.0 parts by weight |
| CPI-2 | — | — | — | Irgacure 184 30.0 parts by weight Lucirin TPO 10.0 parts by weight | 60.0 parts by weight |

In Table 2,

*1: 2-hydroxy-2-methyl-1-phenylpropan-1-one produced by Chiba Specialty Chemicals

*2: a 3:1 mixture of 1-hydroxycyclohexyl phenyl ketone and bis(2,6-dimethoxybenzoyl)-2,4,4-trimethylpentyl-phosphine oxide produced by Chiba Specialty Chemicals

*3: benzyldimethyl ketal produced by Chiba Specialty Chemicals

*4: 1-hydroxycyclohexyl phenyl ketone produced by Chiba Specialty Chemicals

*5: 2,4,6-timethylbenzoyldiphenylphosphine oxide produced by BASF

Photocurability of Paint Composition for Road Markings

Paint compositions for road markings were prepared by blending a photocurable resin, a filler (titanium oxide or calcium carbonate), glass beads, additives (dispersant and precipitation inhibitor) and Photopolymerization Initiator Solution PI-4 to have a composition shown in Table 3 and photocurability of the compositions obtained was examined. The photocurability test was performed as follows.

Photocurability Test 1:

Each paint composition for road markings was coated on an aluminum plate in a size of 150×75 cm by changing the film thickness and then photocured using an ultraviolet curing system machine (Model UVC-5033, manufactured by Ushio Inc.) under the conditions such that the output electric power was 120 W/cm, the light source was a metal halide lamp UVL-6000M2-N1, the irradiation distance was 25 cm and the conveyer speed was 1.65 m/min. The film thickness when tack on the back side of the film was eliminated by once passing was examined. The results obtained are shown in Table 3 (Examples 1 to 4).

Photocurable Test 2

After the composition was coated on an aluminum plate in a size of 150×75 mm by changing the film thickness, glass beads No. 1 according to JIS R 3301 were dispersed on the surface of each coated material to have a coverage of 170 g/m$^2$, the coated material was allowed to stand on the roof on Feb. 5, 1997, 2:00 p.m., and the maximum film thickness when tack on the back side of the coated film was eliminated at 8:00 a.m. on the next day was examined. The results obtained are shown in Table 3 (Examples 1 to 4).

TABLE 3

Test of Photocurability of Paint Composition for Road Markings

|  |  | Example 1 | Example 2 | Example 3 | Example 4 |
|---|---|---|---|---|---|
| Photocurable resin R-1 | *1 | 100 | 100 | 100 | 100 |
| Rutile-type titanium dioxide | *2 | 30 | — | 17 | — |
| Anatase-type titanium dioxide | *3 | — | 30 | — | 17 |
| Calcium carbonate | *4 | 100 | 100 | 120 | 120 |
| Glass beads No. 3 | *5 | 100 | 100 | 100 | 100 |
| Additives | *6 | 3 | 3 | 3 | 3 |
| Photopolymerization Initiator Solution PI-4 |  | 7 | 7 | 7 | 7 |
| Photocurability test 1 cured thickness (mm) |  | 0.5–0.6 | 0.5–0.6 | 0.9–1.0 | 0.9–1.0 |
| Photocurability test 2 cured thickness (mm) |  | 2.0 | 2.0 | 3.0 | 3.0 |

*1: RIPOXY SP-1529X/TPGDA/EB754/isobornyl acrylate = 5/2/1/2 (by weight)
   RIPOXY SP-1529X: bispehnol A type epoxy acrylate resin produced by Showa Highpolymer Co., Ltd.
   TPGDA: tripropylene glycol diacrylate produced by Dicel UCB KK
   EB754: a 70/30 mixture of linear-chained acryl oligomer/1,6-hexanediol diacrylate produced by Dicel UCB KK
*2: TAIPAQUE CR-58 produced by Ishihara Sangyo Kaisha Ltd.
*3: TAIPAQUE A-220 produced by Ishihara Sangyo Kaisha Ltd.
*4: ESCALON #100 produced by Sankyo Seifun KK.
*5: GB-402T produced by Toshiba Ballotini Co., Ltd.
*6: Aerosil #200 and the like produced by Nippon Aerosil KK.

Kind of Photopolymerization Initiator Solution and Photocurability

Photocurability was evaluated according to the curability tests 1 and 2 by varying only the photopolymerization initiator solution in the paint compositions for road markings of Example 1. The results obtained are shown in Table 4 (Examples 5 to 8). For the purpose of comparison, only the photopolymerization initiator solution in the paint composition for road markings of Example 1 was changed to CPI-1 or CPI-2 and the photocurability of the resulting compositions was evaluated according to the photocurability tests 1 and 2. The results obtained are shown in Table 4 (Comparative Examples 1 and 2).

TABLE 4

Photocurability Test by Changing the Kind of Photopolymerization Initiator Solution

|  | Kind of Photopolymerization Initiator Solution | Photocurability Test 1, cured film thickness (mm) | Photocurability Test 2, cured film thickness (mm) |
|---|---|---|---|
| Example 5 | PI-1 | 0.5–0.6 | 2.0 |
| Example 6 | PI-2 | 0.5–0.6 | 2.0 |
| Example 7 | PI-3 | 0.5–0.6 | 2.0 |
| Example 8 | PI-5 | 0.5–0.6 | 2.0 |
| Comparative Example 1 | CPI-1 | 0.1 or less | 0.5 or less |
| Comparative Example 2 | CPI-2 | 0.2–0.3 | 1.0 |

Kind of Photocurable Resin and Photocurability

Photocurability was evaluated according to the photocurable tests 1 and 2 by changing only the photocurable resin in the paint compositions for road markings of Example 1. The results obtained are shown in Table 5 (Examples 9 to 13).

TABLE 5

Photocurability Test by Changing the Kind of Photocurable Resin

|  | Kind of Photocurable Resin | Photocurability Test 1, cured film thickness (mm) | Photocurability Test 2, cured film thickness (mm) |
|---|---|---|---|
| Example 9 | R-2 *1 | 0.5–0.6 | 2.0 |
| Example 10 | R-3 *2 | 0.5–0.6 | 2.0 |
| Example 11 | R-4 *3 | 0.5–0.6 | 2.0 |
| Example 12 | R-5 *4 | 0.4–0.5 | 1.8 |
| Example 13 | R-6 *5 | 0.4–0.5 | 1.8 |

*1: RIPOXY SP-1509/TTEGDA/EB111 = 6/2/2 (by weight)
   RIPOXY SP-1509: bisphenol A type epoxy acrylate resin produced by Showa Highpolymer Co., Ltd.
   TTEGDA: tetraethylene glycol diacrylate produced by Dicel UCB KK
   EB111: aliphatic monoepoxy acrylate produced by Dicel UCB KK
*2: ED3701/1•9ND-A/ED767/dicyclopentenyl acrylate = 5/2/1/2 (by weight)
   EB3701: modified bisphenol A type epoxy acrylate resin produced by Dicel UCB KK
   1•9ND-A:1,9-nonanediol diacrylate produced by Kyoei-Sha Kagaku KK
   EB767: a 63/37 mixture of lienar-chained acryl oligomer/isobornyl acrylate produced by Dicel UCB KK
*3: AT-600/1•6HX-A/isobornyl acrylate = 6/2/2 (solids content by weight)
   AT-600: urethane acrylate resin produced by Kyoei-Sha Kagaku KK
   1•6HX-A:1,6-hexanediol diacrylate produced by Kyoei-Sha Kagaku KK
*4: RIPOXY SP-1529X/1•9ND-A/EB767/isobornyl acrylate = 30/30/10/30 (by weight)
*5: RIPOXY SP-1509/NP-A/EB754/4-tert-butylcyclohexyl acrylate = 20/30/15/35 (by weight)
   NP-A: neopentyl glycol diacrylate produced by Kyoei-Sha Kagaku KK Test of Capabilities of Coated Film The paint composition for road markings of Example 4 was coated using a 10-mil (0.25 mm) applicator (except for the tire adhesion test) and capabilities of the film cured under the conditions of the photocurability test 1 were examined (Example 14). In the tire adhesion test, the paint composition for road markings of Example 4 was coated by a 1-mm applicator and photocured under the conditions of the photocurability test 1 except for changing the conveyer speed to 7 m/min. The substrate coated with the paint composition for road markings was a substrate specified in respective tests of JIS K 5665.

For Comparative Examples, a Class 1 coating material for road markings (ordinary temperature type) under the trade name of HARD-LINE C-1200 WHITE (produced by Atomix Co., Ltd., Comparative Example 3) or a Class 3 coating material (melting type) under the trade name of ATOM-LINE #15 WHITE (produced by Atomix Co., Ltd., Comparative Example 4) was used.

The test was performed according to JIS K 5665 except for durability. The durability was tested using ABSTER Unit No. 2 manufactured by Atomix Co., Ltd. by imposing a load of 30 kg on a tire (SUPERBAN 356 RADIAL TIRE 135/95R10, trade name, produced by Yokohama Rubber KK) and spreading quarts sand No. 6 (5 kg) for accelerating abrasion. The results of the test on capabilities of the coated film are shown in Table 6.

TABLE 6

Test of Capabilities of Coated Film

Measurement Results

| Tested Items | Example 14 | Comparative Example 3 (Class 1) | Comparative Example 4 (Class 3) | Standard of JIS K 5665 |
|---|---|---|---|---|
| Luminous reflectance | 79.4 | 84.0 | 80 | 75 or more (Class 3) |
| Contrast ratio | 0.99 | 0.98 | — | 0.97 or more |
| Bleeding | 78.3 0.99 | 83.2 0.98 | — — | on asphalt felt: 70 or more luminous reflectance ratio: 0.90 or more |
| Tire adhesion | 1 mm coating, 1 pass acceptance | acceptance | acceptance | within 15 minutes (Class 1) within 3 minutes (Class 3) |
| Abrasion resistance | 75 | 188 | 104 | 500 mg or less (Class 1) |
| Water resistance | acceptance | acceptance | acceptance | dipping for 24 hours |
| Alkali resistance | acceptance | acceptance | acceptance | dipping in calcium hydroxide for 18 hours |
| Glass bead fixing ratio (%) | 100 | 100 | — | 90% or more |
| Durability (after execution of 9 hours) | 0.7 | 2.1 | 3.5 | 10 g or less (*company test) |

The photocurable paint compositions for road markings of the present invention could be photocured within a very short time even when a film having a large thickness was formed. Furthermore, the coated film was accepted with respect to all items of JIS standard and moreover, revealed to be by far superior in the abrasion resistance and the durability to the ordinary type (Comparative Example 3) and the melting type (Comparative Example 4).

The photocurable composition of the present invention can be photocured within a very short time and accordingly highly suitable as a coating material for road markings. Furthermore, since the photocurable composition of the present invention is higher in the abrasion resistance and durability than conventional coating materials for road markings and can form a film having a small thickness, the amount of the coating material used can be reduced and the labor required for the coating work is little. Moreover, it is not necessary to bring in a heat source and melt the coating material as in the case of a melting-type coating material and therefore, safe and comfortable working can be ensured.

While the invention has been described in detail and with reference to specific examples thereof, it will be apparent to one skilled in the art that various changes and modifications can be made therein without departing from the spirit and scope thereof.

What is claimed is:

1. A photocurable paint composition for road markings comprising:

(A) 100 weight parts of a compound having an ethylenically unsaturated group, wherein said compound having an ethylenically unsaturated group does not comprise a monofunctional monomer having a boiling point less than 150° C., (B) 10 to 400 weight parts of a filler, (C) 30 to 400 weight parts of glass beads having a particle size of 0.01 to 10 mm, (D) 0.001 to 5 weight parts of a cationic dye represented by formula (1)

$$D^- \bullet A_1^- \qquad (1)$$

wherein $D^+$ represents a cation having an absorption maximum wavelength in the wavelength region of from 400 to 1,200 mm, and $A_1^-$ represents an anion, (E) 0.005 to 10 weight parts of a quaternary organic borate sensitizer represented by formula (2):

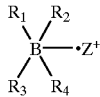

wherein $R_1$, $R_2$, $R_3$ and $R_4$ each independently represents an alkyl group, an aryl group, an aralkyl group, an alkenyl group, an alkynyl group, a silyl group, a heterocyclic group or a halogen atom, and $Z^+$ represents a cation, and (F) 0.01 to 10 weight parts of an ultraviolet radical polymerization initiator capable of generating a radical upon absorption of light at a wavelength of 400 nm or less.

2. A photocurable paint composition for road markings as claimed in claim 1, wherein said filler is present in an amount of 20 to 200 weight parts.

3. A photocurable paint composition for road markings as claimed in claim 1, which further contains one or more compounds selected from the group consisting of a diaryliodonium salt, a triarylsulfonium salt, an N-alkoxypyridinium salt, a triazine compound having a trihalomethyl group and a halogenated sulfone compound, as a polymerization accelerator.

4. A photocurable paint composition for road markings as claimed in claim 1, wherein $D^+$ of the cationic dye represented by formula (1) is one or more compounds selected from the group consisting of polymethine, triarylmethane, diarylmethane, xanthene, acridine, azine, oxazine and thiazine compounds.

5. A photocurable paint composition for road markings as claimed in claim 1, wherein the ultraviolet radical polymerization initiator is one or more compounds selected from the group consisting of compounds represented by formula (3) and/or formula (4):

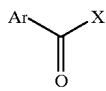

(3)

wherein Ar represents an aryl group, X represents an alkyl group, an alicyclic group, a benzyl group, an alkoxycarbonyl group, a benzoyl group, an aryl group or a phosphinoyl group having a substituent;

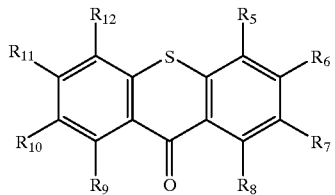

(4)

wherein $R_5$, $R_6$, $R_7$, $R_8$, $R_9$, $R_{10}$, $R_{11}$, and $R_{12}$ each independently represents a hydrogen atom, an alkyl group, an alkoxy group or a halogen atom.

6. A photocurable paint composition for road markings as claimed in claim 1, wherein said compound having an ethylenically unsaturated group comprises:

(a) 10 to 90 weight % of an epoxy (meth)acrylate resin, a urethane (meth)acrylate resin or a mixture thereof, (b) 5 to 55 weight % of a monofunctional monomer having an alkyl group with from 4 to 18 carbon atoms, a monofunctional monomer having an alicyclic group or a mixture thereof, and (c) 5 to 40 weight % of polyfunctional monomer.

7. The photocurable paint composition for road markings as claimed in claim 1, wherein said (A) compound having an ethylenically unsaturated group is an epoxy acrylate resin with a bisphenol structure.

* * * * *